UNITED STATES PATENT OFFICE.

JOHN A. SCHAEFFER, OF JOPLIN, MISSOURI, ASSIGNOR TO THE PICHER LEAD COMPANY, OF JOPLIN, MISSOURI, A CORPORATION OF MISSOURI.

MANUFACTURE OF LEAD ARSENATE.

1,172,741.          Specification of Letters Patent.      Patented Feb. 22, 1916.

No Drawing.      Application filed September 24, 1915. Serial No. 52,466.

*To all whom it may concern:*

Be it known that I, JOHN A. SCHAEFFER, a citizen of the United States of America, residing in the city of Joplin, in the county of Jasper, in the State of Missouri, have invented a certain new and useful Improvement in the Manufacture of Lead Arsenate, of which the following is a true and exact description.

My invention relates to the manufacture of lead arsenate and has for its object the production of this substance by a new method of manufacture which at the same time reduces the cost, and results in a very high quality of the substance.

The term lead arsenate as commercially used, applies to any or all of the various lead arsenates, the most common of which are the tri-plumbic $Pb_3(AsO_4)_2$, and the plumbic hydrogen arsenate $PbHAsO_4$, and the ordinary commercial lead arsenate comprises a mixture of these arsenates in very varying proportions depending on the method of manufacture and the purity of the materials used in its manufacture.

For use as an insecticide it is recognized that the lead oxid should be somewhat in excess to insure that all the arsenic oxid shall be rendered insoluble and in fact the percentage of arsenic oxid in the commercial arsenates varies very greatly. I have found in samples a great variation in the water present and eliminating the water I have found the arsenic oxid to vary from 10.30 per cent. to 38.48 per cent. and the lead oxid from 49.58 to 77.93 per cent.

The commonly used method of producing lead arsenate is to mix a solution of a soluble lead salt, either lead acetate or lead nitrate, with a solution of sodium arsenate, the result being the precipitation of a lead arsenate which is sold either in a wet or dry condition.

My new method is based on my discovery that lead monoxid PbO in a very fine state of division will when mixed with water, by reason of its fine state of division and high reactivity, react with sodium arsenate or its equivalent in a manner similar to that of the soluble lead salts heretofore used with the production of a high grade of lead arsenate, and my invention consists in the method of manufacturing lead arsenate which consists in mixing finely divided lead monoxid in suspension in a fluid with an aqueous solution consisting essentially of one or more soluble arsenates by which I mean to include sodium arsenate or the chemically equivalent though more expensive substances, potassium arsenate or arsenic acid or of a mixture of any of these substances, and boiling the mixture to form and precipitate the lead arsenate.

I have obtained the best results by using lead monoxid in the form of fumed litharge, a substance formed by blowing very hot air over melted and highly heated litharge to produce and carry away a vapor or fume of litharge and catching such fume in bags or screens. This fume is in a state of exceedingly fine division and has consequently an intense reactivity. To secure satisfactory quantitative results with lead monoxid divided by mechanical means, the subdivision must be carried farther than has heretofore been usual with lead monoxid commercially known as pulverized litharge.

In practice I have obtained excellent results as follows: I mix ten parts by weight of fumed litharge with two hundred parts of water, triturating the litharge with the first addition of water to insure that all the particles shall be wet and in condition to thoroughly mix with and stay in suspension in the water. I also make a solution of ten parts by weight of commercial sodium arsenate containing 36.56 per cent. of $As_2O_5$ in one hundred parts of water; I add the mixture of volatilized litharge and water to the solution and boil the mixture with the result that the volatilized litharge reacts quickly with the sodium arsenate forming a flocculent lead arsenate which product I wash thoroughly.

The analysis of the compound formed as above described calculated to a moisture free basis showed a lead oxid content of 72.47 per cent. and an arsenic oxid content of 24.41 per cent. and only the slightest trace of water, soluble arsenic oxid and lead oxid.

By varying the proportions of the raw materials and the time of boiling, lead arsenates of varying composition can be obtained.

My described process has not only the great advantage of producing lead arsenate from cheaper raw material than heretofore employed, but in addition its product is entirely free from soluble lead acetate and lead nitrate which are apt to be present in the product of the older methods.

Having now described my invention, what I claim as new and desire to secure by Letters Patent, is—

1. The method of manufacuring lead arsenate which consists in mixing very finely divided lead monoxid suspended in water with a solution consisting essentially of one or more soluble arsenates, and heating the mixture to induce the formation of the lead arsenate.

2. The method of manufacturing lead arsenate which consists in mixing fumed litharge suspended in water with a solution consisting essentially of one or more soluble arsenates, and heating the mixture to induce the formation of the lead arsenate.

JOHN A. SCHAEFFER.